(12) United States Patent
Liao

(10) Patent No.: US 12,504,120 B2
(45) Date of Patent: Dec. 23, 2025

(54) WASTE OIL RECYCLING DEVICE

(71) Applicant: LIH YANN INDUSTRIAL CO., LTD., Taichung (TW)

(72) Inventor: Po-Lin Liao, Taichung (TW)

(73) Assignee: LIH YANN INDUSTRIAL CO., LTD., Taichung (TW)

( * ) Notice: Subject to any disclaimer, the term of this patent is extended or adjusted under 35 U.S.C. 154(b) by 87 days.

(21) Appl. No.: 18/394,891

(22) Filed: Dec. 22, 2023

(65) Prior Publication Data
US 2025/0207725 A1    Jun. 26, 2025

(51) Int. Cl.
*B65D 1/34*   (2006.01)
*F16N 31/00*  (2006.01)

(52) U.S. Cl.
CPC .................................. *F16N 31/004* (2013.01)

(58) Field of Classification Search
CPC ...... B65D 25/00; B65D 1/34; B65D 21/0233; B65D 90/24; B67C 2011/022; F01M 11/0458; F16N 31/004; F16N 31/002; F16N 31/00; F16N 31/006
USPC ............. 220/573, 571; 141/98, 331, 86, 340
See application file for complete search history.

(56) References Cited

U.S. PATENT DOCUMENTS

| | | | | |
|---|---|---|---|---|
| 1,994,844 A | * | 3/1935 | Vahle ..................... | F01M 11/04 285/298 |
| 4,274,645 A | * | 6/1981 | Ferguson .................. | B62B 1/18 184/106 |
| 4,697,670 A | * | 10/1987 | Arruda .................. | F16N 31/002 141/378 |
| 5,921,292 A | * | 7/1999 | Fouts .................. | G07F 17/3244 141/342 |

FOREIGN PATENT DOCUMENTS

TW              293469 U     12/1996

* cited by examiner

*Primary Examiner* — King M Chu
(74) *Attorney, Agent, or Firm* — Muncy, Geissler, Olds & Lowe, P.C.

(57) ABSTRACT

A waste oil recycling device is provided, wherein the waste oil recycling device includes: a basin configured to be mounted to a barrel and including a first internal space and a basin opening in communication with each other, the first internal space being configured to be in communication with an interior of barrel, the basin opening being open toward a first direction; at least one connection tube extending on the basin in the first direction and configured to be in communication with the interior of the barrel; and a receiver connected to the at least one connection tube and including a second internal space and a receiving opening in communication with each other, the second internal space being in communication with the at least one connection tube.

10 Claims, 6 Drawing Sheets

WASTE OIL RECYCLING DEVICE

BACKGROUND OF THE INVENTION

Field of the Invention

The present invention relates to a recycling device, and particularly to a waste oil recycling device.

Description of the Prior Art

Lubricating oil, such as engine oil, can lubricate movable members to reduce wear between members and take away impurities and heat. It is common in various mechanical devices or transmission devices. After a period of time, the lubricating oil will be gradually oxidized, deteriorate due to heat, and contain more impurities. Therefore, it needs to drain the old lubricating oil (waste oil) from the mechanical device after a predetermined period of time, and then to refill the mechanical device with new lubricating oil.

Most of the conventional waste oil collection devices have corresponding established shapes for specific devices (such as automobiles). For example, TW 293469 discloses a waste oil recovery device for automobiles, which is specially used to receive the oil discharged from the automobile chassis. The waste oil recycling device includes a barrel and a receiving member in communication with each other, and the receiving member is configured to receive a large amount of waste oil discharged from the car and guides it into the barrel for storage.

However, this type of waste oil recycling device is bulky, high, and heavy, so it is only suitable for collecting waste oil under the car, and cannot be widely used in other devices of different shapes and sizes. Once the barrel has no storage space, the user needs to move the oil in the barrel to another storage barrel before continuing to use it, which is inconvenient and takes a lot of time. The present invention is, therefore, arisen to obviate or at least mitigate the above-mentioned disadvantages.

SUMMARY OF THE INVENTION

The main object of the present invention is to provide a waste oil recycling device which can be widely receive waste oil discharged from oil outlets of various devices.

To achieve the above and other objects, a waste oil recycling device is provided, wherein the waste oil recycling device includes: a basin configured to be mounted to a barrel and including a first internal space and a basin opening in communication with each other, the first internal space being configured to be in communication with an interior of barrel, the basin opening being open toward a first direction; at least one connection tube extending on the basin in the first direction and configured to be in communication with the interior of the barrel; and a receiver connected to the at least one connection tube and including a second internal space and a receiving opening in communication with each other, the second internal space being in communication with the at least one connection tube.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
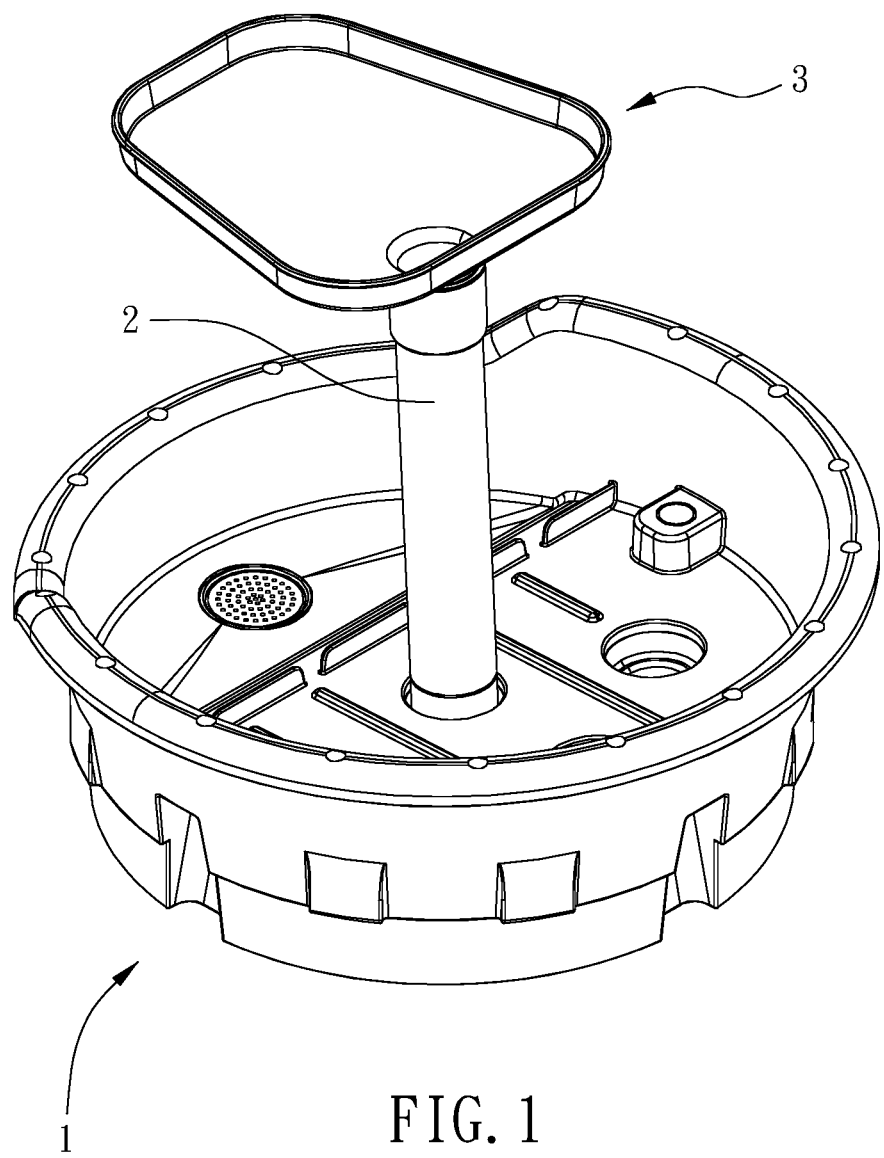
FIG. 1 is a stereogram of an exemplary embodiment of the present invention.
Figure 2:
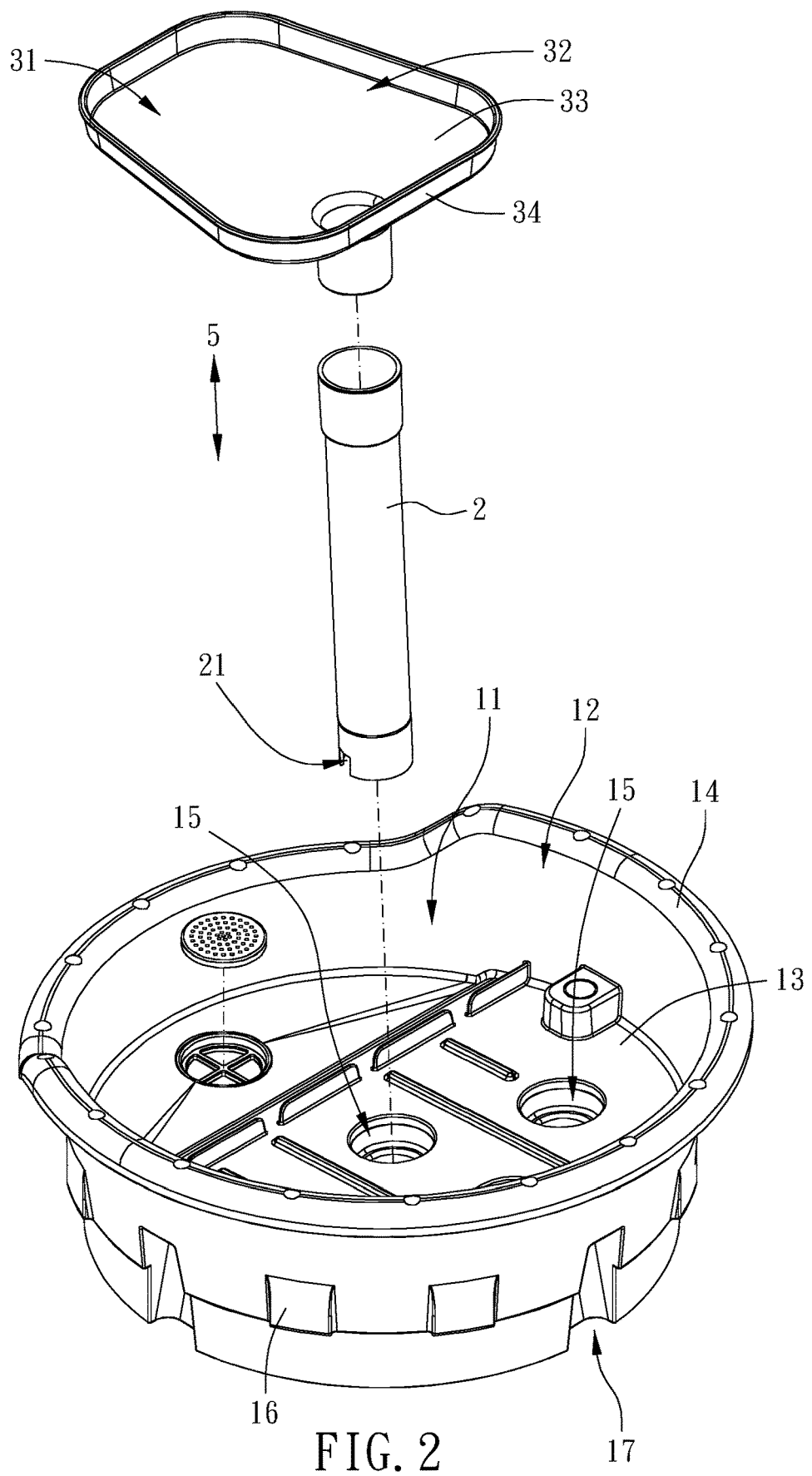
FIG. 2 is a breakdown drawing of an exemplary embodiment of the present invention.
Figure 3:
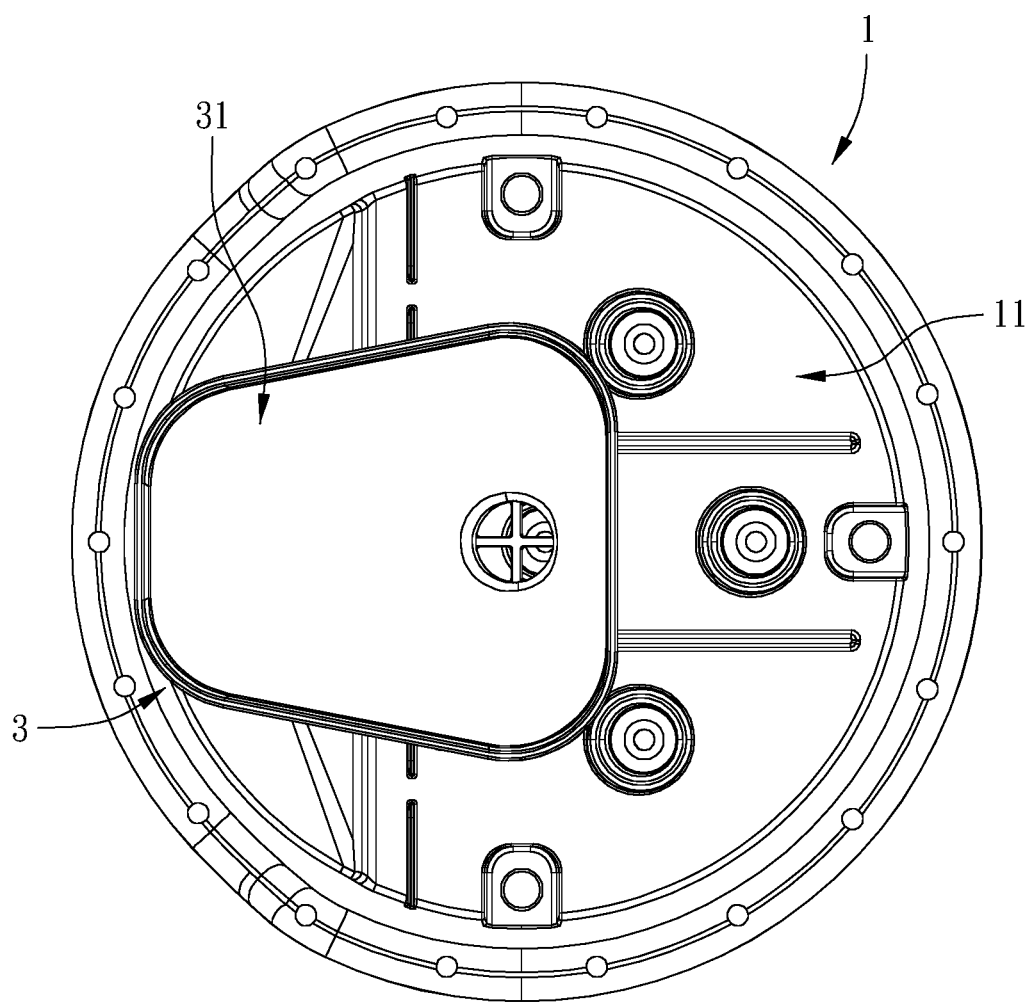
FIG. 3 is a top view of an exemplary embodiment of the present invention.
Figure 4:
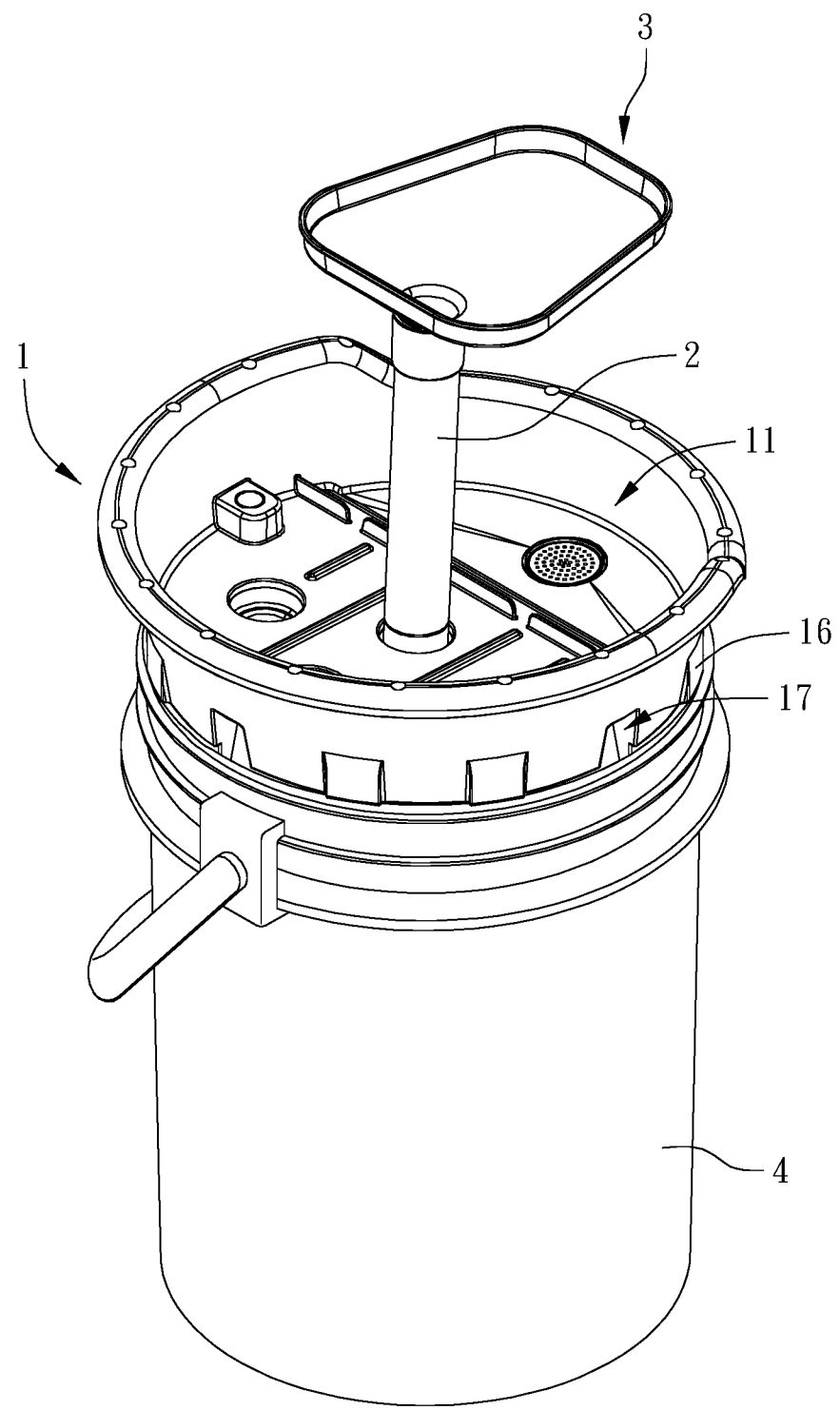
FIGS. 4 and 5 are drawings showing operation of a waste oil recycling device according to an exemplary embodiment of the present invention.
Figure 5:
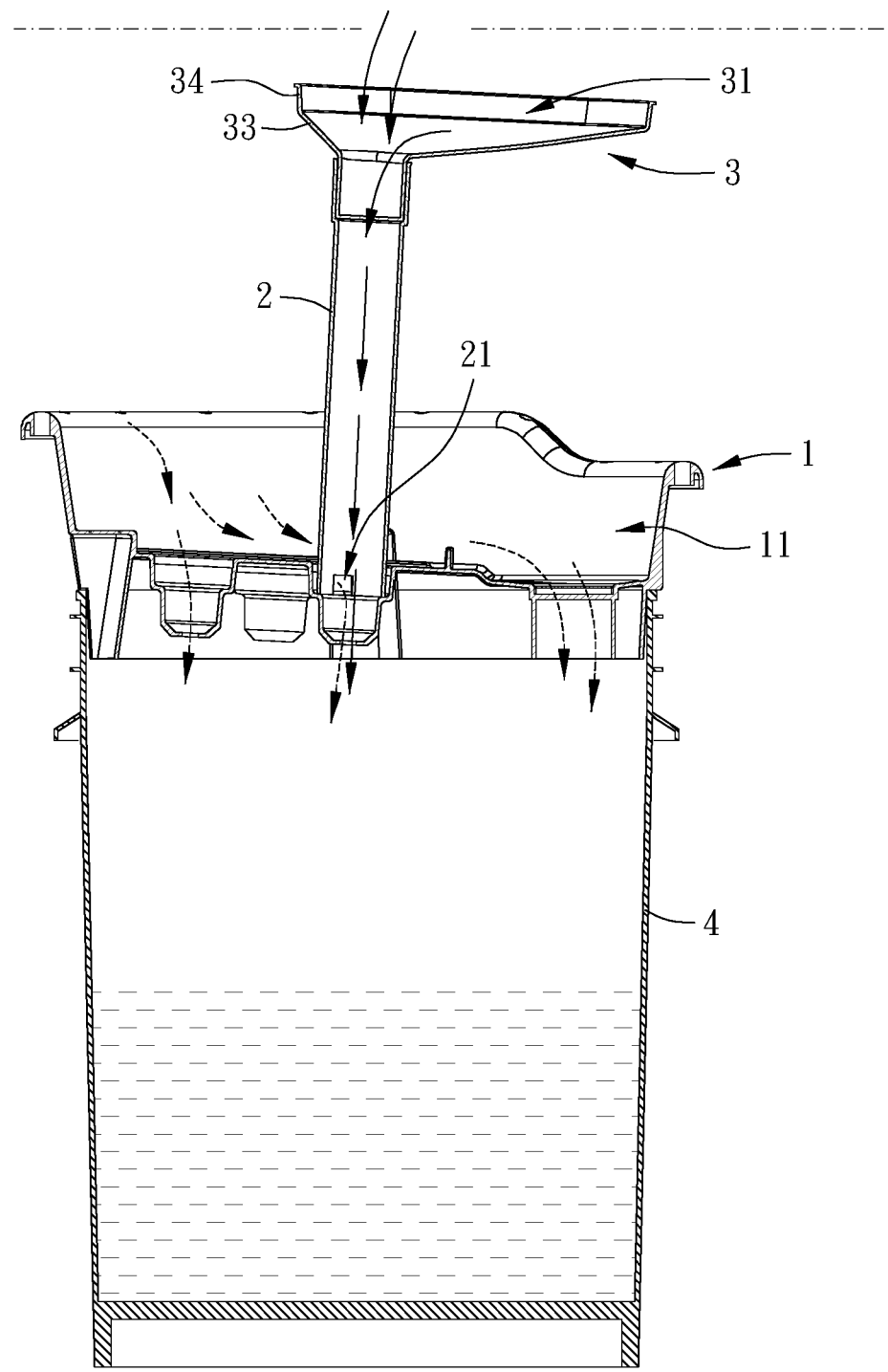

Please refer to FIGS. 1 to 6 for an exemplary embodiment of the present invention. A waste oil recycling device of the present invention includes a basin 1, at least one connection tube 2 and a receiver 3.

The basin 1 is configured to be mounted to a barrel 4 (such as a five-gallon bucket), the basin 1 includes a first internal space 11 and a basin opening 12 in communication with each other, the first internal space 11 is configured to be in communication with an interior of the barrel 4, and the basin opening 12 is open toward a first direction 5. Specifically, the basin 1 further includes a plurality of projections 16 and a plurality of recesses 17, the plurality of projections 16 and the plurality of recesses 17 are alternatively arranged on an outer surface of the basin 1, the plurality of recesses 17 are configured to be in communication with the interior of the barrel 4, and the plurality of projections 16 are configured to be abutted against a periphery of the barrel 4, so that it is easy to mount the basin 1 to the barrel 4. When the space of the barrel 4 is filled with waste oil, the basin 1 can be quickly moved to another barrel for later use. Since the basin 1 can be freely assembled to barrels of different sizes, it can widely receive waste oil from the oil outlets of various devices, and the barrel 4 can be directly covered with a cover and recycled. There is no need to dump the waste oil into a recycling bin, which is extremely convenient in use.

The at least one connection tube 2 extends on the basin 1 in the first direction 5 and is configured to be in communication with the interior of the barrel 4. The receiver 3 is connected to the at least one connection tube 2, the receiver 3 includes a second internal space 31 and a receiving opening 32 in communication with each other, and the second internal space 31 is in communication with the at least one connection tube 2. The receiver 3 serves as the second component to receive waste oil. The receiver 3 is higher than the basin 1 and can receive waste oil adjacent to the higher oil outlet (such as the oil outlet of the car chassis), and the receiver 3 located below the basin 1 can receive waste oil from other devices or containers at the same time, which can effectively improve work efficiency.

Specification, the basin 1 further includes at least one through hole 15 configured to be in communication with the interior of the barrel, and the at least one connection tube 2 is inserted in the at least one through hole 15, to reliably guide the waste oil in the second internal space 31 into the inside of the barrel 4 through the at least one through hole 15. In this embodiment, the at least one connection tube 2 is detachably inserted in the at least one through hole 15, such that it can be disassembled and stored when not in use to reduce the occupied volume, and when the at least one connection tube 2 structure is damaged, it can be easily replaced with other new products. Specifically, the basin 1 further includes a basin bottom wall 13 and a basin side wall 14, the basin side wall 14 projects transversely from the basin bottom wall 13, the at least one through hole includes a plurality of through holes 15, the plurality of through holes 15 are disposed through the basin bottom wall 13, the at least one connection tube 2 extends in the first internal space 11 and is optionally inserted in one of the plurality of through holes 15.

In this embodiment, the connection tube 2 has a maximum length larger than a maximum distance with which the basin side wall 14 projects from the basin bottom wall 13 so that the connection tube 2 is protrusive beyond the basin opening 12, and thus the receiver 3 is located outside the first internal space 11 to maintain the capacity of the first internal space 11.

Preferably, an end of the at least one connection tube 2 which is inserted in one of the plurality of through holes 15 includes at least one perforation 21, the at least one perforation 21 in communication with the first internal space 11 via the one of the plurality of through holes 15. When the basin 1 receives the waste oil, the waste oil can still flow into the interior of the barrel 4 through the at least one perforation 21 and through the through hole 15. The at least one perforation 21 can prevents waste oil from accumulating outside the at least one through hole 15 that is connected to the at least one connection tube 2.

Preferably, one of the plurality of through holes 15 is located at a center of the basin 1 so that the at least one connection tube 2 is inserted in the center of the basin 1, and thus the center of gravity of the waste oil recycling device can be maintained in the center to improve stability when placed.

Preferably, the receiver 3 is lighter than the basin 1, ensuring that the center of gravity of the waste oil recycling device is low to improve the ability to resist shaking.

The receiver 3 is detachably connected to the at least one connection tube 2, having the advantages of being disassembled for storage when not in use and easy to replace with new products. The receiver 3 further includes a receiver bottom wall 33 and a receiver side wall 34, the shape of the receiver bottom wall 33 is different from the shape of the basin bottom wall 13, and the receiver side wall 34 projects transversely from the receiver bottom wall 33. In this embodiment, the receiver bottom wall 33 extends and taper in a direction away from the receiving opening 32, which is conducive to guidance of the waste oil. A maximum distance with which the receiver side wall 34 projects from the receiver bottom wall 33 is smaller than a maximum distance with which the basin side wall 14 projects from the basin bottom wall 13.

In a direction perpendicular to the first direction 5, the receiver 3 is preferably not protrusive beyond the basin 1, which ensures that the basin 1 can catch the waste oil that overflows the receiver 3. When the basin opening 12 and the receiving opening 32 face toward the first direction 5, a dimension of the second internal space 31 in the direction perpendicular to the first direction 5 is smaller than a dimension of the first internal space 11 in the direction perpendicular to the first direction 5 so that the receiver 3 can be adjusted to be at one of various angles and in one of various positions.

Figure 6:
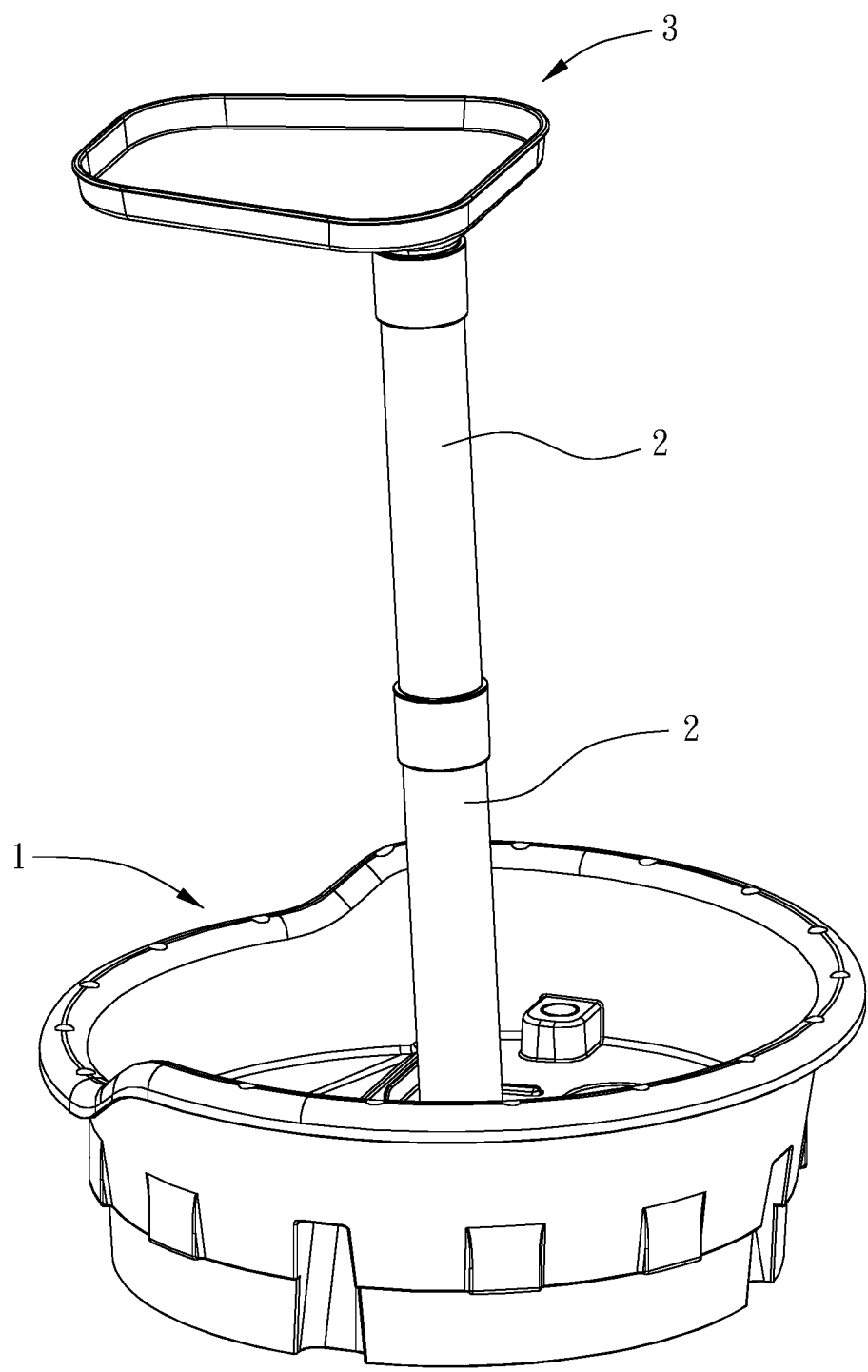
FIG. 6 is a stereogram of a waste oil recycling device including connection tubes according to an exemplary embodiment of the present invention.

In FIGS. 1 to 5, the at least one connection tube includes only one connection tube 2; however, the user can increase the height difference between the receiver 3 and the basin 1 in the first direction 5 according to their needs. In FIG. 6, the at least one connection tube 2 includes two connection tubes 2 which can be greatly raised to facilitate access to the higher oil outlet.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A waste oil recycling device including:
    a basin configured to be mounted to a barrel and including a first internal space and a basin opening in communication with each other, the first internal space being configured to be in communication with an interior of barrel, the basin opening being open toward a first direction;
    at least one connection tube extending on the basin in the first direction and configured to be in communication with the interior of the barrel; and
    a receiver connected to the at least one connection tube and including a second internal space and a receiving opening in communication with each other, the second internal space being in communication with the at least one connection tube;
    wherein the basin further includes a plurality of through holes configured to be in communication with the interior of the barrel, each of the at least one connection tube extends in the first internal space, and each of the at least one connection tube is capable of being selectively inserted and positioningly engaged in any one of the plurality of through holes.

2. The waste oil recycling device of claim 1, wherein the basin further includes a basin bottom wall and a basin side wall, the basin side wall projects transversely from the basin bottom wall, and the connection tube has a maximum length larger than a maximum distance with which the basin side wall projects from the basin bottom wall so that the connection tube is protrusive beyond the basin opening.

3. The waste oil recycling device of claim 1, wherein the basin further includes a basin bottom wall and a basin side wall, the basin side wall projects transversely from the basin bottom wall, the receiver further includes a receiver bottom wall and a receiver side wall, the receiver side wall projects transversely from the receiver bottom wall, and a maximum distance with which the receiver side wall projects from the receiver bottom wall is smaller than a maximum distance with which the basin side wall projects from the basin bottom wall.

4. The waste oil recycling device of claim 1, wherein each of the plurality of through holes is stepped and tapered toward the interior of the barrel.

5. The waste oil recycling device of claim 1, wherein the basin further includes a basin bottom wall and a basin side wall, the basin side wall projects transversely from the basin bottom wall, and the plurality of through holes are disposed through the basin bottom wall.

6. The waste oil recycling device of claim 5, wherein an end of the at least one connection tube which is inserted in one of the plurality of through holes includes at least one perforation in communication with the first internal space via the one of the plurality of through holes.

7. The waste oil recycling device of claim 5, wherein one of the plurality of through holes is located at a center of the basin.

8. The waste oil recycling device of claim 1, wherein when the basin opening and the receiving opening face toward the first direction, a dimension of the second internal space in a direction perpendicular to the first direction is smaller than a dimension of the first internal space in the direction perpendicular to the first direction.

9. The waste oil recycling device of claim 1, wherein in a direction perpendicular to the first direction, the receiver is not protrusive beyond the basin.

10. The waste oil recycling device of claim 5, wherein the connection tube has a maximum length larger than a maximum distance with which the basin side wall projects from the basin bottom wall so that the connection tube is protrusive beyond the basin opening; the receiver further includes a receiver bottom wall and a receiver side wall, the receiver side wall projects transversely from the receiver bottom wall, and a maximum distance with which the receiver side wall projects from the receiver bottom wall is smaller than a maximum distance with which the basin side wall projects from the basin bottom wall; an end of the at least one connection tube which is inserted in one of the plurality of through holes includes at least one perforation in communication with the first internal space via the one of the plurality of through holes; one of the plurality of through holes is located at a center of the basin; when the basin opening and the receiving opening face toward the first direction, a dimension of the second internal space in a direction perpendicular to the first direction is smaller than a dimension of the first internal space in the direction perpendicular to the first direction; in a direction perpendicular to the first direction, the receiver is not protrusive beyond the basin; the basin further includes a plurality of projections and a plurality of recesses, the plurality of projections and the plurality of recesses are alternatively arranged on an outer surface of the basin, the plurality of recesses are configured to be in communication with the interior of the barrel, and the plurality of projections are configured to be abutted against a periphery of the barrel; the shape of the receiver bottom wall is different from the shape of the basin bottom wall, and the receiver bottom wall extends and taper in a direction away from the receiving opening; the at least one connection tube is detachably inserted in the one of the plurality of through holes; the receiver is detachably connected to the at least one connection tube; the receiver is lighter than the basin.

* * * * *